(12) United States Patent
Yang et al.

(10) Patent No.: US 11,717,127 B2
(45) Date of Patent: Aug. 8, 2023

(54) CLEANING ROBOT

(71) Applicant: SHENZHEN FLY RODENT DYNAMICS INTELLIGENT TECHNOLOGY CO., LTD., Shenzhen (CN)

(72) Inventors: Jun Yang, Shenzhen (CN); Xiaofei Chen, Shenzhen (CN); Changtai Xia, Shenzhen (CN); Junpeng Qian, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 214 days.

(21) Appl. No.: 17/165,015

(22) Filed: Feb. 2, 2021

(65) Prior Publication Data
US 2022/0071464 A1 Mar. 10, 2022

(30) Foreign Application Priority Data

Sep. 4, 2020 (CN) .......................... 202010921653.9

(51) Int. Cl.
*A47L 11/00* (2006.01)
*A47L 11/282* (2006.01)
(Continued)

(52) U.S. Cl.
CPC ......... *A47L 11/282* (2013.01); *A47L 11/4005* (2013.01); *A47L 11/4008* (2013.01);
(Continued)

(58) Field of Classification Search
CPC .. A47L 11/282; A47L 11/4013; A47L 11/408; A47L 11/4083; A47L 11/4088; A47L 2201/00; A47L 11/4038; A47L 9/30
See application file for complete search history.

(56) References Cited

U.S. PATENT DOCUMENTS 9,038,233 B2   5/2015 Jones et al.
2019/0038106 A1*  2/2019 Jang .................... A47L 11/4041

FOREIGN PATENT DOCUMENTS

CN    202313142 U    7/2012
CN    104315457 A    1/2015
(Continued)

OTHER PUBLICATIONS

International Search Report of PCT Patent Application No. PCT/CN2020/141122 dated Jun. 2, 2021.

*Primary Examiner* — Katina N. Henson
*Assistant Examiner* — Alyssa R Williams
(74) *Attorney, Agent, or Firm* — IPRO, PLLC; Na Xu

(57) ABSTRACT

A cleaning robot include a main body and a cleaning module. The cleaning module includes a box body, at least one driving mechanism, and at least one rotating plate assembly. The box body includes a first connector. The at least one driving mechanism is positioned on a bottom surface of the box body, electrically connected to the first connector, and includes at least one drive shaft. Each rotating plate assembly is connected to a corresponding drive shaft and includes a cleaning surface. The cleaning surface is configured to rotate under the drive of the corresponding drive shaft to clean a to-be cleaned surface. The main body includes a second connector. The box body is detachably positioned on the main body, such that the first connector is connected to or disconnected to the second connector.

17 Claims, 12 Drawing Sheets

(51) Int. Cl.
*A47L 11/40* (2006.01)
*F21V 8/00* (2006.01)

(52) U.S. Cl.
CPC ....... *A47L 11/4013* (2013.01); *A47L 11/4038* (2013.01); *A47L 11/4069* (2013.01); *A47L 11/4083* (2013.01); *A47L 11/4088* (2013.01); *G02B 6/0021* (2013.01); *A47L 2201/06* (2013.01)

(56) References Cited

FOREIGN PATENT DOCUMENTS

| | | | | |
|---|---|---|---|---|
| CN | 102955291 B | * | 12/2015 | ........... G02B 6/0013 |
| CN | 105534415 A | | 5/2016 | |
| CN | 106963297 A | | 7/2017 | |
| CN | 108670135 A | | 10/2018 | |
| CN | 111329404 A | | 6/2020 | |
| CN | 109844625 B | * | 1/2022 | ................ F21S 2/00 |
| KR | 100405244 B1 | * | 11/2003 | |
| WO | WO-2018149311 A1 | * | 8/2018 | .............. A47L 11/28 |

* cited by examiner

CLEANING ROBOT

CROSS-REFERENCE TO RELATED APPLICATIONS

The present disclosure claims priority of Chinese Patent Application No. 202010921653.9, filed on Sep. 4, 2020, titled "CLEANING ROBOT", the contents of which are incorporated herein by reference.

TECHNICAL FIELD

The present disclosure relates to the field of cleaning equipment technologies, and particularly to a cleaning robot.

BACKGROUND

With the continuous improvement of people's living standards, cleaning robots are becoming more and more popular, the degree of intelligence of which is also developing from a primary level to a higher level, and there is a trend that the cleaning robots will gradually replace the traditional manual cleaning. According to the way of cleaning the floor, cleaning robots can be classified as sweeping robots, mopping robots, and scrubbing robots. The sweeping robots sweep the dust and garbage on the floor, the mopping robots mop the floors with cleaning cloth or cleaning pads in a wet-type, and the scrubbing robots scrub the floors by rotating cleaning components in a wet-type.

In general, a scrubbing robot includes a chassis, a driving mechanism, a rotating plate assembly, and a liquid supply mechanism. The driving mechanism is positioned on the chassis, the rotating plate assembly is positioned outside the chassis and is connected to the driving mechanism, and the liquid supply mechanism is positioned on the chassis or on the driving mechanism, in order to provide cleaning liquid for the rotating plate assembly. The rotating plate assembly includes a scrubbing surface which is substantially parallel to the floor. The driving mechanism drives the rotating plate assembly to rotate, and the liquid supply mechanism provides the cleaning liquid for the rotating plate assembly. The scrubbing surface of the rotating plate assembly continuously rotates to scrub the floor. The scrubbing robot usually includes at least two rotating plate assemblies, two of which are positioned side by side to improve the cleaning width of the scrubbing robot.

SUMMARY

An embodiment of the present disclosure provides a cleaning robot, and the cleaning robot includes a main body and a cleaning module. The cleaning module includes a box body, at least one driving mechanism, and at least one rotating plate assembly. The box body includes a first connector. The at least one driving mechanism is positioned on a bottom surface of the box body and electrically connected to the first connector. The at least one driving mechanism includes at least one drive shaft. Each rotating plate assembly is connected to a corresponding drive shaft of the at least one driving mechanism and includes a cleaning surface. The cleaning surface is configured to rotate under the drive of the corresponding drive shaft to clean a to-be-cleaned surface. The main body includes a second connector. The box body is detachably positioned on the main body, such that the first connector is connected to or disconnected to the second connector.

BRIEF DESCRIPTION OF THE DRAWINGS

To describe the embodiments of the present disclosure or the technical solutions in the related art more clearly, the following will give a brief introduction to the drawings associated with the embodiments of the present disclosure or the related art. It is obvious that the drawings in the following description are only intended to illustrate some embodiments of the present disclosure. For those skilled in the art, some deformations can be obtained according to these drawings without any creative work.

Figure 1:
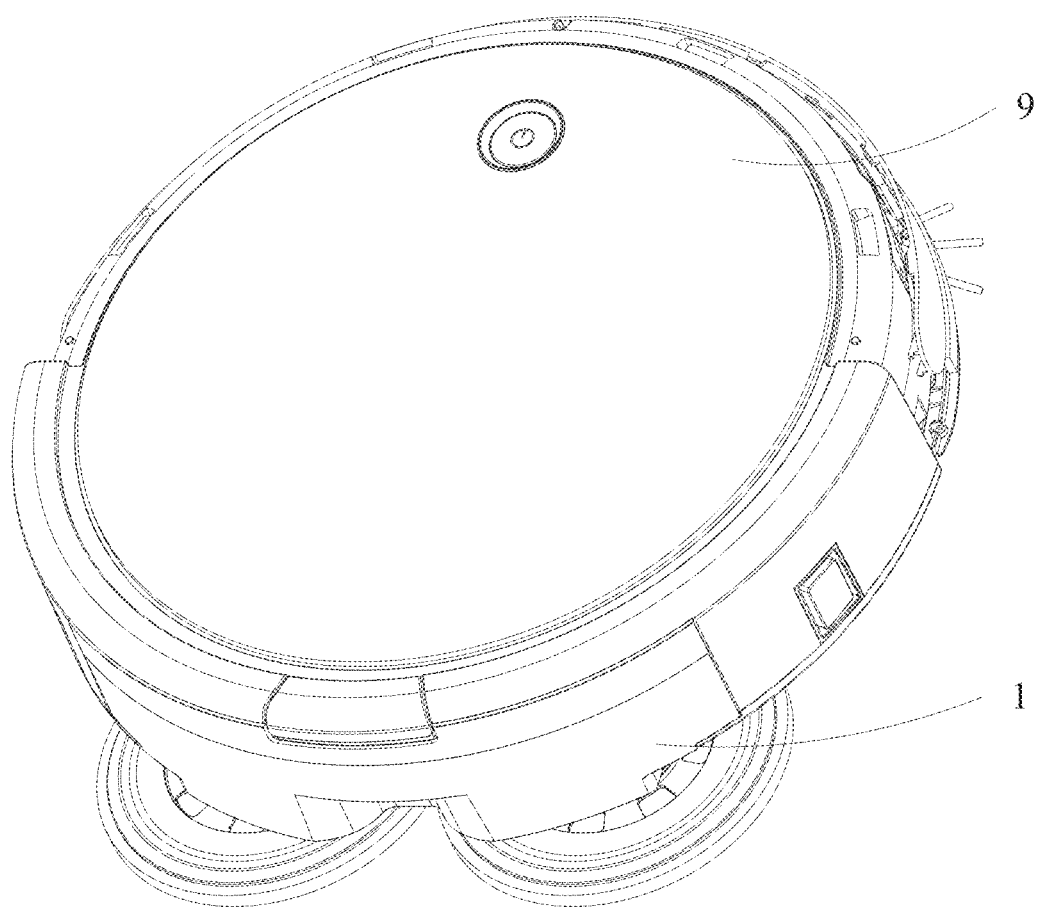
FIG. 1 is a schematic view of a cleaning robot according to an embodiment of the disclosure.
Figure 2:
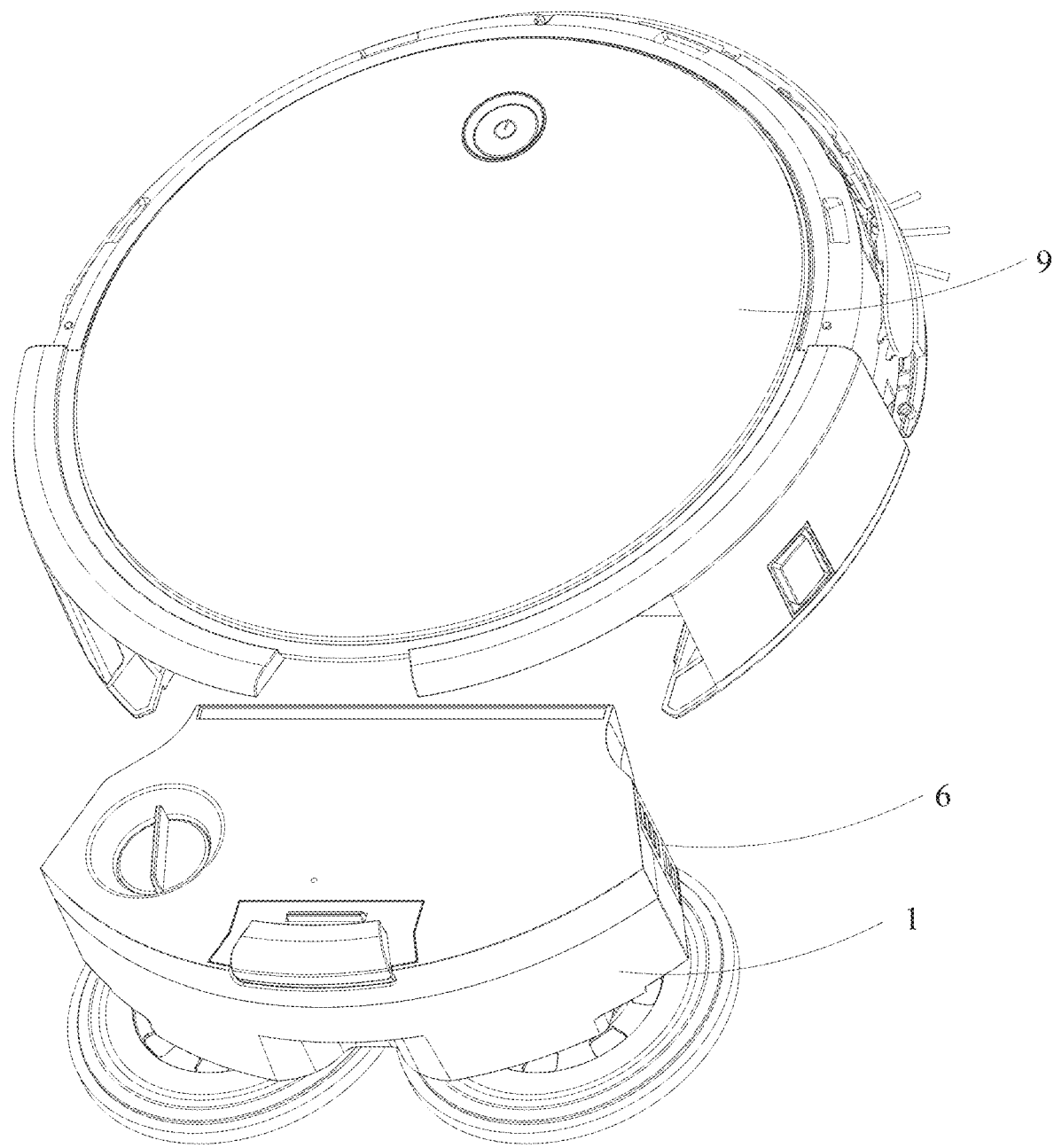
FIG. 2 is an exploded view of the cleaning robot of FIG. 1.
Figure 3:
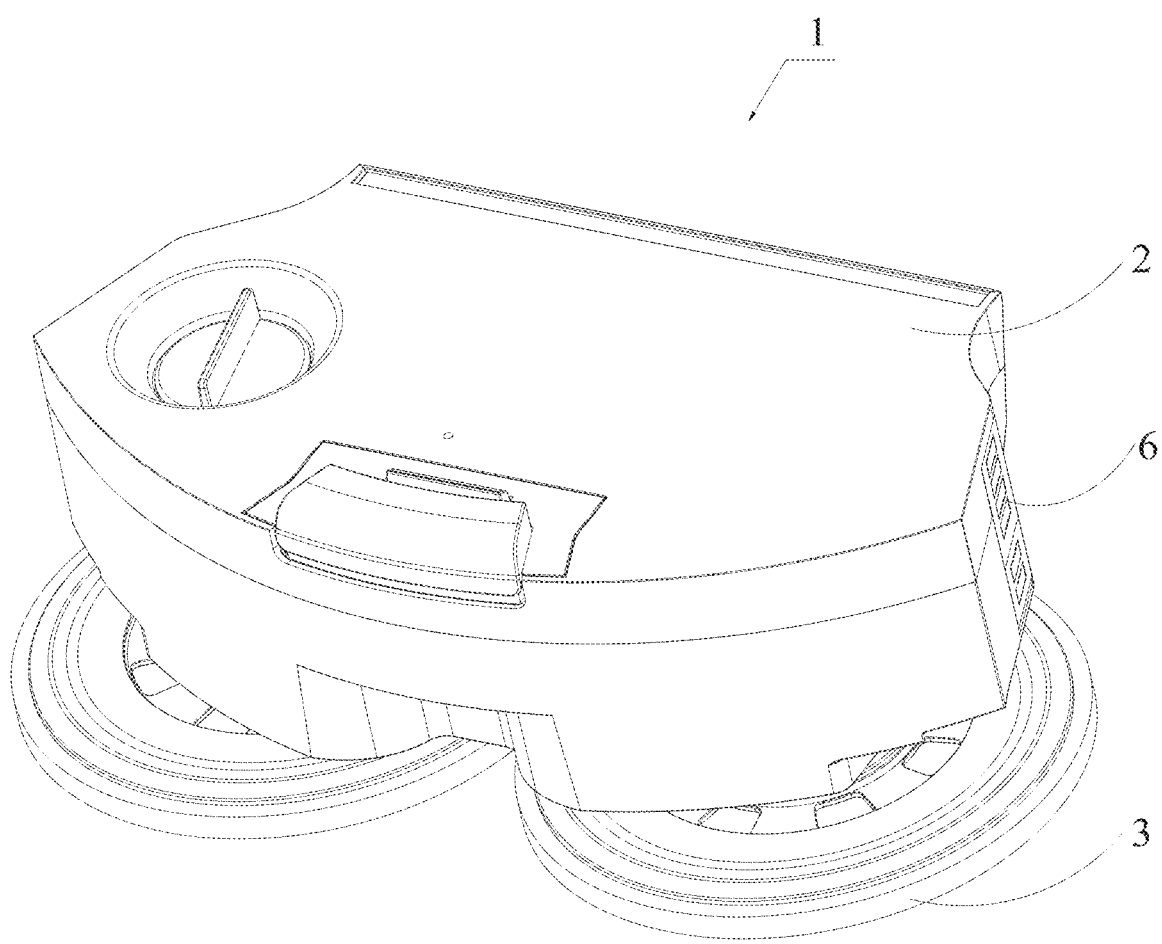
FIG. 3 is a schematic view of a cleaning module of the cleaning robot of FIG. 1, the cleaning module including a box body.
Figure 4:
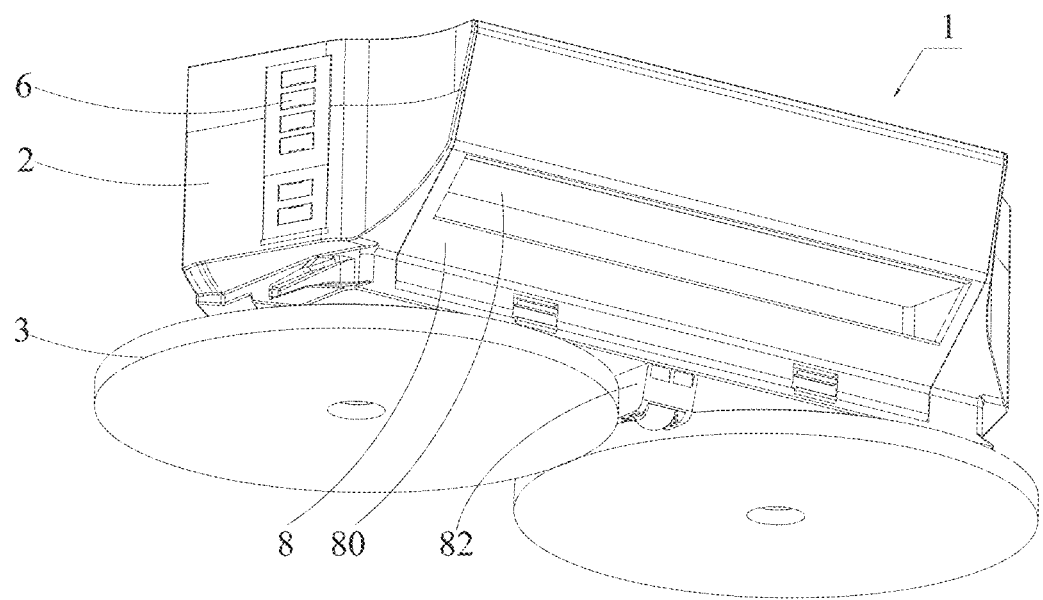
FIG. 4 is another schematic view of the cleaning module of FIG. 3, but viewed from another angle.
Figure 5:
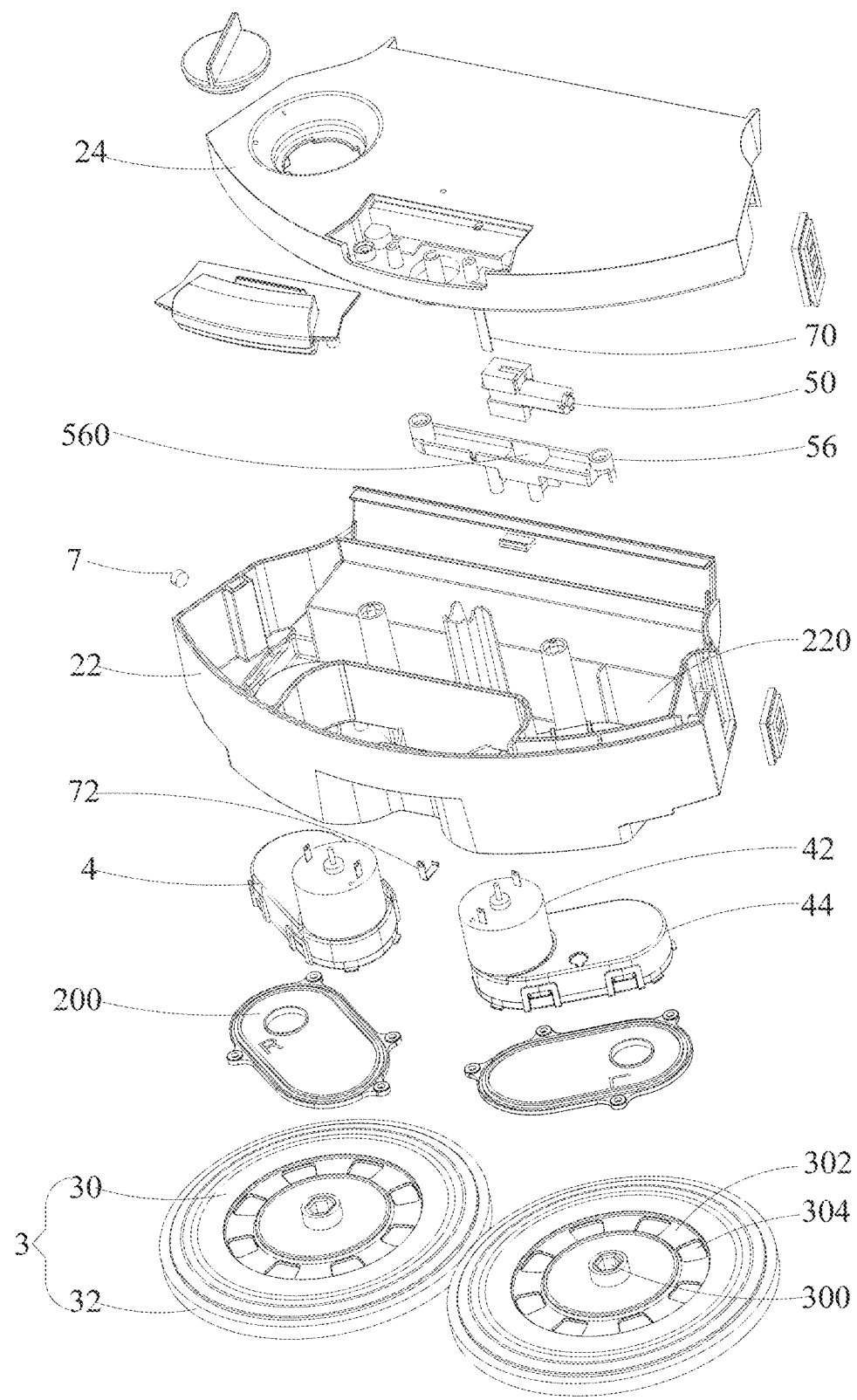
FIG. 5 is an exploded view of the cleaning module of FIG. 3.
Figure 6:
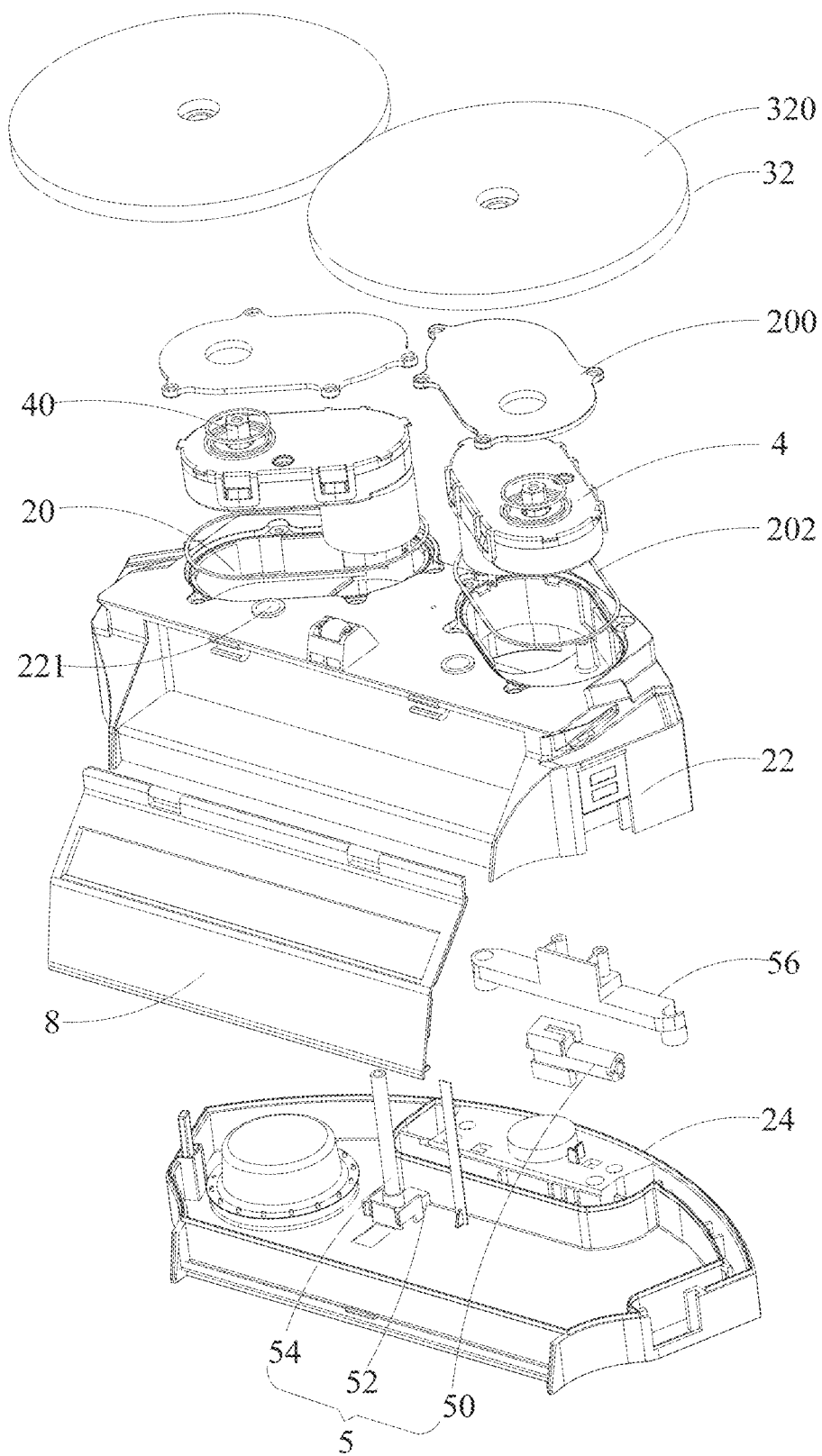
FIG. 6 is another exploded view of the cleaning module of FIG. 3, but viewed from another angle.

The objectives, function features and advantages of the disclosure will be further explained with reference to the attached drawings in combination with the embodiments.

DETAILED DESCRIPTION

The technical solutions in the embodiments of the present disclosure will be described clearly below with reference to the drawings of the embodiments of the present disclosure. Obviously, the described embodiments are only a part of the embodiments of the present disclosure, and not exhaustive. Based on the embodiments of the present disclosure, all other embodiments obtained by one of ordinary skill in the art without creative work fall within the protection scope of the present disclosure.

It should be noted that all directional descriptions (such as top, bottom, left, right, front, rear, etc.) in the embodiments of the present disclosure are only used to explain the relative position and motion of the components under a certain attitude (as shown in the attached figure). If the specific attitude changes, the directional indication will change accordingly.

In addition, the description of "first", "second" and the like in the present disclosure is only for the purpose of description and cannot be understood as indicating or implying their relative importance or implicitly indicating the number of technical features indicated. Thus, the features defined as "first" and "second" may explicitly or implicitly include at least one of the features. The technical solutions of various embodiments can be combined with each other, and the combinations can be achieved by one of ordinary skilled in the art. When the combinations of technical solutions are contradictory or unable to be realized, it shall be considered that the combinations of the technical solutions are inexistent and are not within the scope of protection of the present disclosure.

The present disclosure provides an embodiment of a cleaning robot, referring to FIGS. 1-6, the cleaning robot 1 includes a cleaning module 1 and a main body 9. The cleaning module 1 includes a box body 2, at least one rotating plate assembly 3, and at least one driving mechanism 4. The box body 2 includes a first connector 6. The at least one driving mechanism 4 is positioned on a bottom surface of the box body 2, electronically connected to the first connector 6, and includes at least one drive shaft 40. Each rotating plate assembly 3 is connected to a corresponding drive shaft and includes a cleaning surface. The cleaning surface is configured to rotate under the drive of the corresponding drive shaft 40 to clean a to-be cleaned surface. The main body 9 includes a second connector; the box body 2 is detachably positioned on the main body 9, such that the first connector 6 is connected to or disconnected to the second connector.

In this embodiment, the driving mechanism 4 is positioned on the bottom surface of the box body 2 and is connected to the rotating plate assembly 3. Thus, the driving mechanism 4 and the rotating plate assembly 3 are integrated with the box body 2 to form the cleaning module 1. The driving mechanism 4 drives the rotating plate assembly 3 to rotate, and the cleaning surface of the rotating plate assembly 3 rotates to clean the floor. Because the box body 2 is detachably positioned on a body of the cleaning robot, compared with a built-in driving mechanism in a robot body, when the driving mechanism 4 of the present disclosure breaks down, it is convenient to maintain and replace the cleaning module 1. In addition, when the box body 2 is positioned on the main body 9, the first connector 6 is electrically connected to the second connector, no additional structure is needed to connect the box body 2 to the main body 9. When the box body 2 is detached from the main body 9, the first connector 6 is disconnected to the second connector, thus achieving the assembly and disassembly of the cleaning module 1 efficiently.

In the present disclosure, it should be understood that the number of the rotating plate assembly 3 and the number of the driving mechanism 4 are arbitrary as needed. For example, when the cleaning module 1 includes only one rotating plate assembly 3 and only one driving mechanism 4, the only one driving mechanism 4 includes only one drive shaft 40, the only one drive shaft 40 is connected to the rotating plate assembly 3. When the cleaning module 1 includes two rotating plate assemblies 3, one driving mechanism 4, and two drive shafts 40, each drive shaft 40 is connected to a respective one of the two rotating plate assemblies 3, and the driving mechanism 4 drives the two rotating plate assemblies 3 to rotate in two opposite directions. When the cleaning module 1 includes two rotating plate assemblies 3 and two driving mechanisms 4, each driving mechanism 4 includes one drive shaft 40, and each drive shaft 40 is connected to a respective one of the two rotating plate assemblies 3. When the cleaning module 1 includes three rotating plate assemblies 3, the number of the driving mechanisms 4 can be 1, 2 or 3, and the three rotating plate assemblies 3 can be driven to rotate by three drive shafts 40 of one driving mechanism 4, respectively. When the cleaning module 1 includes four rotating plate assemblies 3, the number of the driving mechanism 4 can be 1, 2 or 4, and the four rotating plate assemblies 3 can be driven to rotate by four drive shafts 40 of one driving mechanism 4, respectively.

In this embodiment, the bottom surface of the box body 2 defines at least one groove 20, each groove 20 receives at least one driving mechanism 4. Because the driving mechanism 4 is positioned in the groove 20, the main part of the driving mechanism 4 will not protrude out of the bottom surface of the box body 2, thus reducing the height of the entire cleaning module 1, and avoiding the excessive distance between the rotating plate assembly 3 and the bottom surface of the box body 2.

In the present disclosure, it should be understood that the number of the groove 20 is arbitrary as needed, and the number of the driving mechanism 4 positioned in a single groove 20 is also arbitrary as needed. For example, one groove 20 can accommodate one driving mechanism 4, two driving mechanisms 4, and even all the driving mechanisms 4. In addition, in other embodiments, the driving mechanism 4 can be directly mounted on the bottom surface of the box body 2, that is, the driving mechanism 4 in all protrudes out of the bottom surface of the box body 2, which can also solve the technical problem of the present disclosure.

In this embodiment, the box body 2 includes at least one bottom cover 200 and at least one first seal ring 202. The bottom cover 200 and the first seal ring 202 are corresponding to the groove 20 in position. The bottom cover 200 covers the periphery of the groove 20, and the first sealing ring 202 is positioned between the bottom cover 200 and the periphery of the groove 20. The drive shaft 40 is extending through an opening of the bottom cover 200. The first sealing ring 202 seals the driving mechanism 4. To ensure the sealing between the opening of the bottom cover 200 and the driving mechanism 4, a second seal ring can be positioned between the periphery of the opening of the bottom cover 200 and a surface of the driving mechanism 4.

In this embodiment, each rotating plate assembly 3 includes a rotary plate 30 and a cleaning component 32. The rotary plate 30 is connected to the drive shaft 40. The cleaning component 32 is positioned on the surface of the rotary plate 30 facing away from the driving mechanism 4, and the cleaning surface is the surface 320 of the cleaning component 32 facing away from the rotary plate 30. The cleaning component 32 is mounted on and supported by the rotary plate 30. When the cleaning component 32 cleans the floor, the rotary plate 30 presses the cleaning component 32, thus improving the cleaning effect.

In the present disclosure, it should be understood that the cleaning liquid can be output from the box body 2 to the cleaning component 32 and wet the cleaning component 32, thus achieving scrubbing the floor. The cleaning liquid can also be transmitted from other containers of the cleaning robot to the cleaning component 32 through a liquid transmission mechanism to wet the cleaning component 32, so as to achieve scrubbing the floor. The cleaning liquid can also be directly sprayed to the floor from the body of the cleaning robot or the box body 2 to wet the floor, and the cleaning component 32 rotates to scrub the floor.

In this embodiment, the rotary plate 30 includes a shaft sleeve 300. The shaft sleeve 300 is sleeved over the drive shaft 40. Specifically, the cross section of the drive shaft 40 is polygonal in shape, and the shaft sleeve 300 defines a polygonal axle hole. Thus, the drive shaft 40 is fitted within the axle hole of the shaft sleeve 300. In some embodiments, the drive shaft 40 is a pentagonal shaft, and the axle hole is a pentagonal hole. Moreover, the rotating plate assembly 3 further includes a screw. The end face of the drive shaft 40 defines a screw hole, and the shaft sleeve 300 defines a connecting hole. The screw is inserted into the screw hole from the connecting hole to lock the rotary plate 30 and the drive shaft 40. In other embodiments, the drive shaft 40 can be fixedly connected to the shaft sleeve 300 through tight fit, or the drive shaft 40 can be connected to the shaft sleeve 300 through buckle connection.

In this embodiment, the box body 2 further defines a liquid cavity 220 for storing the cleaning liquid. The bottom surface of the box body 2 defines at least one liquid outlet 221 spaced from the groove 20. Each liquid outlet 221 is configured to communicate with the liquid cavity 220 and output the cleaning liquid. Each rotary plate 30 includes a first surface facing the driving mechanism 4 and a second surface opposite to the first surface. The first surface defines an annular recess 302 and the annular recess 302 is corresponding to at least one liquid outlet 221 in position. A bottom of the annular recess 302 defines a plurality of through holes 304. The annular recess 302 can always receive the cleaning liquid flowing out of the liquid outlet 221 when the rotary plate 30 rotates, and then the cleaning liquid flows to the cleaning component 32 via the through holes 304. Further, the plurality of through holes 304 are evenly distributed in a circumferential direction of the annular recess 302, thus ensuring the uniform wetting of the cleaning component 32. It should be noted that, in other embodiments, a liquid drainage pipeline can be positioned between the liquid outlet 221 and the annular recess 302, and the liquid drainage pipeline does not affect the rotation of the rotary plate 30.

In the present disclosure, it should be understood that the liquid outlet 221 can communicate with a flow channel positioned at the bottom of the liquid cavity 220, and the cleaning liquid is output under the action of gravity. The liquid outlet 221 can also communicate with a pipeline structure positioned in the liquid cavity 220, and the cleaning liquid can flow to the liquid outlet 221 through the pipeline structure by gravity or air pressure.

Figure 7:
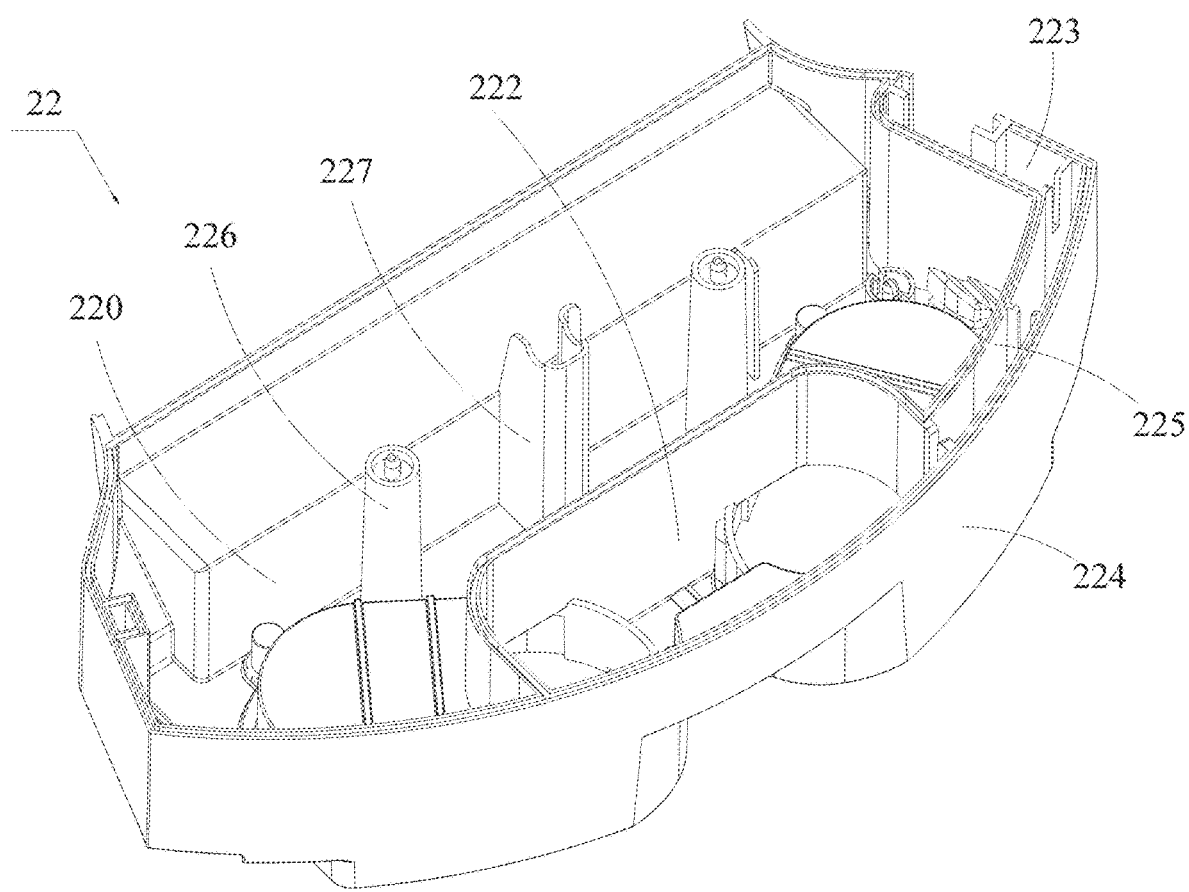
FIG. 7 is a schematic view of a bottom case of the box body of FIG. 3.
Figure 8:
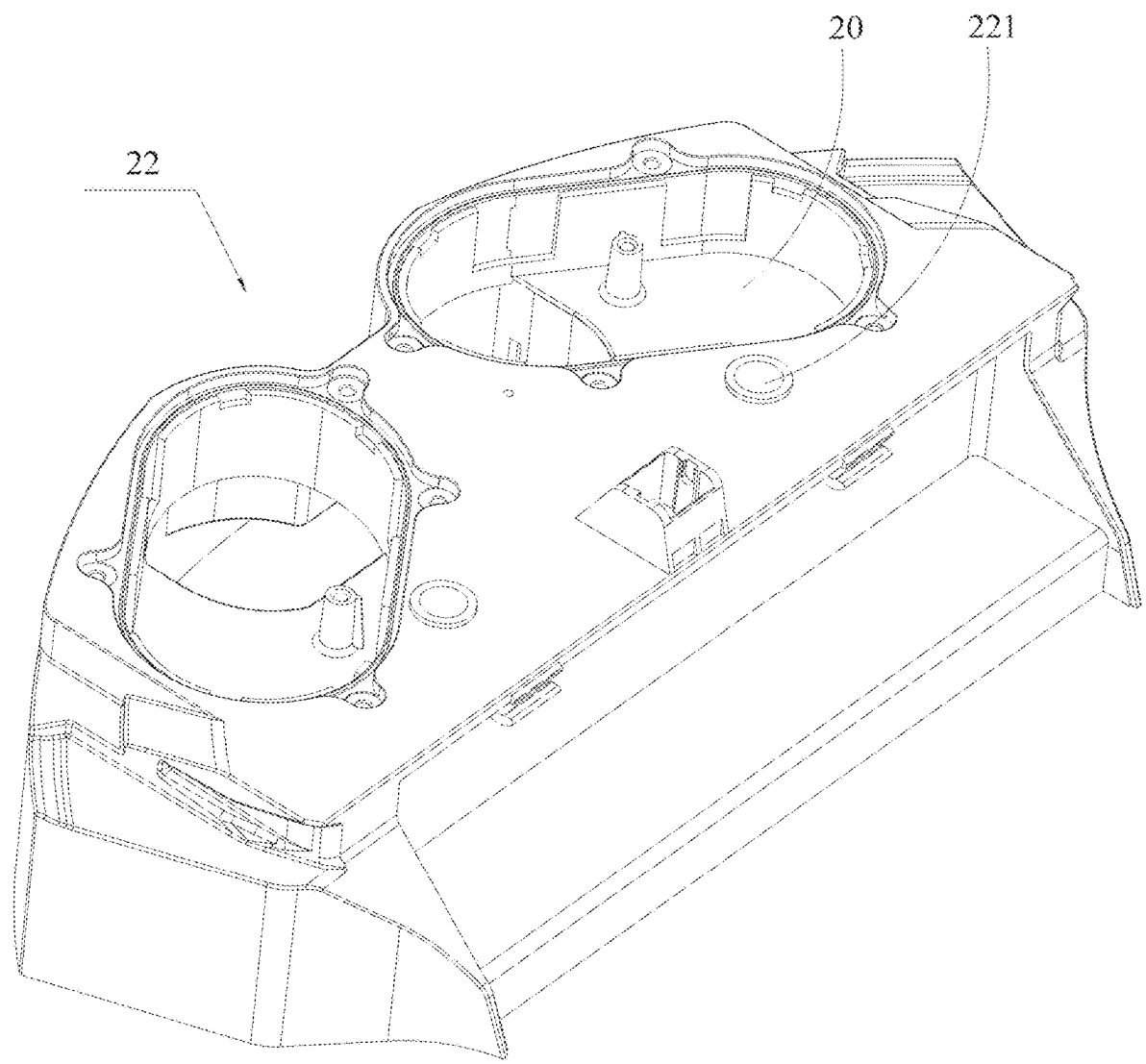
FIG. 8 is another schematic view of the bottom case of the box body of FIG. 3, but viewed from another angle.
Figure 9:
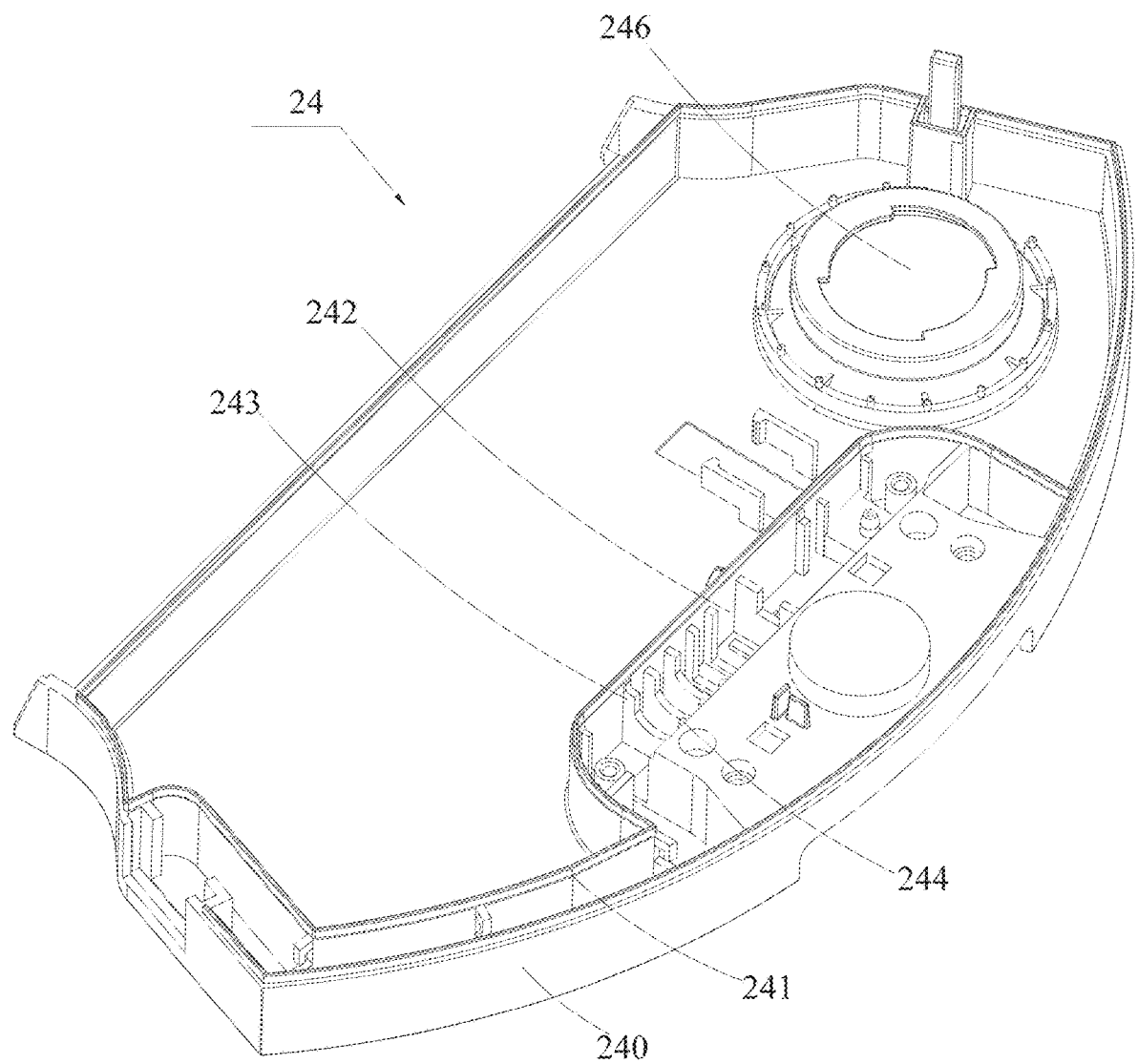
FIG. 9 is a schematic view of a top cover of the box body of FIG. 3.

Referring to FIGS. 7 and 8, in this embodiment, the box body 2 includes at least one liquid releasing column 226 and a connection assembly. The at least one liquid releasing column 226 is positioned on the bottom of the liquid cavity 220. Each liquid releasing column 226 includes a liquid inlet and a liquid outlet 221, the liquid inlet and the liquid outlet 221 are positioned on two opposite ends of each liquid releasing column 226, and the liquid inlet is higher than the maximum liquid level of the liquid cavity 220. The connection assembly is positioned in the liquid cavity 220 and is connected to the liquid inlet of each liquid releasing column 226. The connection assembly includes an input end which is lower than the maximum liquid level of the liquid cavity 220 and is configured to receive the cleaning liquid and deliver the cleaning liquid to the liquid inlet of each liquid releasing column 226.

Because the liquid inlet of the liquid releasing column 226 is higher than the maximum liquid level of the liquid cavity 220, when the box body 2 is installed on the robot body of a robot, the air pressure in the liquid cavity 220 is less than a preset value, and the cleaning liquid cannot enter the liquid inlet, thus avoiding the leakage of the cleaning liquid when the cleaning robot is not working. It can be understood that the gas can be introduced into the liquid cavity 220 through an internal or external air pump to increase the air pressure inside the liquid cavity 220, so as to meet the liquid supply demand, and the liquid supply volume can be controlled accurately.

Referring to FIGS. 5-8, in this embodiment, the at least one rotating plate assembly 3 includes two rotating plate assemblies 3 positioned side by side, and each rotating plate assemblies 3 is connected to a respective one drive shaft 40. The at least one driving mechanism 4 includes two driving mechanism 4, and each driving mechanism 4 is corresponding to a respective one rotating plate assembly 3, and each driving mechanism 4 includes only one drive shaft 40. One driving mechanism 4 drives a respective one rotating plate assembly 3, which simplifies the structure of the driving mechanism 4, and the rotation direction of the two rotating plate assemblies 3 can be easily controlled. It should be noted that the two rotating plate assemblies 3 positioned side by side refers to the two rotating plate assemblies 3 positioned side by side along the cleaning direction of the cleaning robot, that is, a connection line of the two rotating plate assemblies 3 is substantially vertical to the cleaning direction, so as to ensure the maximum cleaning width of the cleaning robot.

In this embodiment, the at least one liquid outlet 221 includes two liquid outlets 221, and two liquid releasing columns 226 are positioned in the liquid cavity 220 correspondingly. Each liquid outlet 221 is positioned correspondingly towards the annular recess 302 of one rotary plate 30.

In this embodiment, two grooves 20 are positioned on the bottom surface of the box body 2 and are spaced apart from each other, and each groove 20 accommodates a respective one driving mechanism 4.

In this embodiments, the peripheries of the two cleaning components 32 of the two side-by-side positioned rotating plate assemblies 3 extend out of the peripheries of the two rotary plates 30, such that the two cleaning components 32 are in contact with each other, thus avoiding the non-scrubbing area formed at the adjacent part of the two cleaning components 32, and improving the overall cleaning effect. It should be noted that, in other embodiments, a third rotating plate assembly 3 can be positioned on the front or rear end of the two rotating plate assemblies 3 to clean the non-scrubbing area of the two cleaning components 32.

In this embodiment, the cleaning component 32 is attached to the surface of the rotary plate 30. The cleaning components 32 of the two rotating plate assemblies 3 positioned side by side are squeezed against each other. Due to the attachment of the cleaning component 32 on the rotary plate 30, the two squeezed cleaning components 32 will not deform and twist, thus improving the cleaning effect of the adjacent parts of the two cleaning components 32. In addition, under the pressing of the rotary plate 30, when cleaning the floor, the cleaning surface of the cleaning component 32 can be ensured to be flat and smooth.

In this embodiment, each cleaning component 32 includes a cleaning body and a plurality of cleaning fluffs, the cleaning fluffs are arranged on the circumferential edge of the cleaning body. The cleaning fluffs of the two adjacent cleaning components 32 are interlaced, which is beneficial to further improving the cleaning effect of the adjacent parts of the two cleaning components 32.

In this embodiment, the plurality of fluffs is further positioned on the surface of the cleaning body facing away from the rotary plate 30. The fluffs can increase the friction coefficient and improve the effect of scrubbing, especially for removal of the dirt adhering to the floor.

In this embodiment, the cleaning component 32 is detachably positioned on the rotary plate 30. The design is convenient for replacement and installation of the cleaning component 32, and can improve the user experience.

In this embodiment, each rotating plate assembly 3 further includes a plurality of hook-and-loop fasteners positioned between the rotary plate 30 and the cleaning component 32. In other embodiments, the cleaning component 32 can be detachably mounted on the rotary plate 30 through a clamping structure.

Referring to FIGS. 5-9, in this embodiment, the box body 2 further includes a receiving cavity 222, the receiving cavity 222 is separated from the liquid cavity 220 and communicates with the two grooves 20, and the receiving cavity 22 receives parts of the two driving mechanism 4. Because the two driving mechanism 4 are partially received in the receiving cavity 222, this facilitates the wiring of the driving mechanisms 4.

In this embodiment, the cleaning module 1 further includes an air pump mechanism 5, and the air pump mechanism 5 is at least partially received in the receiving cavity 222. The air pump mechanism 5 includes an air pump 50 and an air channel. The air pump 50 is received in the receiving cavity 222. The air channel communicates with the air pump 50, runs through a partition wall between the receiving cavity 222 and the liquid cavity 220, and communicates with the liquid cavity 220.

Because the air pump mechanism 5 is received in the receiving cavity 222, and the air channel of the air pump mechanism 5 is communicated with the liquid cavity 220, the poor air tightness between a conventional external air pump and a water tank is overcome, and the stability of the air supply of the air pump mechanism 5 is improved. When the air pump 50 works, gas is produced and transported via the air channel to the liquid cavity 220, thus increasing the air pressure in the liquid cavity 220. The cleaning liquid in the liquid cavity 220 is output via the liquid outlet 221 under the drive of the air pressure, and drips to the annular recess 302 of the rotary plate 30, and then flows to the cleaning component 32 through the through hole 304 of the annular recess 302. Therefore, in the presence of the air pump 50, the liquid output can be accurately controlled, thus avoiding excessive liquid output and over-wet floor, and at the same time, avoiding too little liquid output and adversely affecting the scrubbing effect.

In this embodiment, the box body 2 includes a bottom case 22 and a top cover 24 covering the bottom case 22, thus the bottom case 22 and the top cover 24 cooperatively define the liquid cavity 220 and the receiving cavity 222. The air pump mechanism 5 are positioned on the top cover 24. That is, the air pump mechanism 5 is located at a higher position, thus preventing water from entering into the air outlet of the air channel during air output.

In this embodiments, the box body 2 further includes a mounting bracket 56. Two ends of the mounting bracket 56 is both fixed on the top cover 24. The inner surface of the top cover 24 defines a clamping slot 242; the air pump 50 is installed in the clamping slot 242 and is located between the mounting bracket 56 and the top cover 24. The clamping slot 242 receives the air pump 50, and the mounting bracket 56 and the top cover 24 cooperatively clamps the air pump 50, so as to position the air pump 50 with good fixing effect. It should be understood that, in other embodiments of the present disclosure, the air pump 50 can be fixed on the top cover 24 by other means, such as bonding or buckle connection.

In this embodiment, the clamping slot 242 includes two opposite sidewalls, one of which is formed on the partition wall between the receiving cavity 222 and the liquid cavity 220. The design makes full use of the internal structure of the receiving cavity 222, thus simplifying the arrangement of the clamping slot 242.

In this embodiment, each sidewall includes at least one rib 243, 244, the air pump 50 includes two opposite sides, and the two opposite sides are clamped between the two rids 243, 244 of the two opposite sidewalls.

In this embodiment, the mounting bracket 56 defines a mounting recess 560. The air pump 50 is partially received in the mounting recess 560. The mounting recess 560 and the clamping slot 242 cooperate to accommodate and position the air pump 50, exhibiting good mounting and fixation effect.

In this embodiment, the air channel includes a first pipeline and a second pipeline 52. An end of the first pipeline communicates with the air pump 50, and the other end of the first pipeline communicates with an end of the second pipeline 52. The second pipeline 52 is positioned on the top cover 24, and the other end of the second pipeline 52 runs through the partition wall between the receiving cavity 222 and the liquid cavity 220, and extends into the liquid cavity 220. Because the second pipeline 52 is positioned on the top cover 24 and is higher than the liquid level of the cleaning liquid in the liquid cavity 220, thus preventing the cleaning liquid from entering the other end of the second pipeline 52.

In this embodiment, the first pipeline is a soft rubber hose, which is bendable. When the liquid enters into the first pipeline, the first pipeline will deform under the action of gravity, thus preventing the liquid from directly entering the air pump 50.

In this embodiment, the air channel further includes a third pipeline 54. An end of the third pipeline 54 communicates with the other end of the second pipeline 52, and the other end of the third pipeline 54 is positioned adjacent to the bottom of the liquid cavity 220. Because the other end of the third pipeline 54 is positioned adjacent to the bottom of the liquid cavity 220, when the box body 2 is placed upside down, the liquid level in the liquid cavity 220 is lower than the other end of the third pipeline 54, thus preventing the liquid from entering the third pipeline 54.

In this embodiment, the two liquid outlets 221 of the two side-by-side positioned liquid releasing columns 226 are corresponding to the two rotating plate assemblies 3 in position, respectively. The connection assembly includes a T-pipe and an input pipe, a first outlet of the T-pipe is connected to the liquid inlet of one of the two liquid releasing columns 226 via a first pipeline, a second outlet of the T-pipe is connected to the liquid inlet of the other liquid releasing column 226 via a second pipeline, an inlet of the T-pipe is connected to an end of the input pipe, and the other end of the input pipe is the input end.

When the air pump 50 is working, the air pressure in the liquid cavity 220 increases, and the liquid is pushed into the input end of the input pipe, flows into the inlet of the T-pipe, then flows out of the two outlets of the T-pipe, next enters the liquid inlets of the two liquid releasing columns 226, and finally flows out of the liquid outlets 221 through the two liquid releasing columns 226. When the air pump 50 is not working, the liquid inlets of the liquid releasing columns 226 are higher than the maximum liquid level of the liquid cavity 220, and the liquid cannot enter the liquid inlet.

In this embodiment, the input end is positioned adjacent to the bottom of the liquid cavity 220. When the liquid level in the liquid cavity 220 is at the lowest, the liquid can also be output to the rotating plate assembly 3 through the input end under the drive of the air pressure.

In this embodiment, the box body 2 further includes a support pillar 227. The support pillar 227 is positioned on the bottom of the liquid cavity 220. The T-pipe is positioned on and is supported by the support pillar 227. To prevent leakage, the top end of the support pillar 227 is higher than or flush with the liquid inlet of the liquid releasing column 226.

In this embodiment, the support pillar 227 defines a guide recess, and the input pipe is installed in the guide recess and extends to the bottom of the liquid cavity 220. The input pipe and the pipelines connected to the T-pipe are all soft rubber hoses. The top of the liquid releasing column 226 is provided with a protrusion, and the liquid inlet is defined in the protrusion, which is convenient for inserting into the nozzle of the soft rubber hose and communicating with the soft rubber hose.

In this embodiment, the aperture diameter of the liquid releasing column 226 gradually increases in the direction from the liquid inlet toward the liquid outlet 221. When the box body 2 is inclined, at least one liquid releasing column 226 is completely immersed in the liquid. Because the aperture diameter of the liquid releasing column 226 gradually increases, the liquid leakage of the liquid releasing column 226 can be prevented.

In this embodiment, the box body 2 further includes a wire cavity 223. The wire cavity 223 is separated from the liquid cavity 220 and communicating with the receiving cavity 222. The wirings of the two driving mechanisms 4 and the wirings of the air pump mechanism 5 run through the wire cavity 223 and are led out of the wire cavity 223.

Because a part of the driving mechanism 4 and the air pump 50 are received in the receiving cavity 222, the wirings of the driving mechanism 4 and the wirings of the air pump mechanisms 5 can be directly led to the wire cavity 223 from the receiving cavity 222 and then led out of the wire cavity 223, thus simplifying the wiring. It can be understood that, in other embodiments of the present disclosure, the wiring of the driving mechanism 4 can avoid the liquid cavity 220, pass through the groove 20 or other walls of the box body 2 and then is led out. The wiring of the driving mechanism 4 can also be led out from the bottom surface of the box body 2 via the groove 20.

In this embodiments, the bottom case 22 of the box body 2 includes a first sidewall 224 and a first splicing part 225. The top cover 24 includes a second sidewall 240 and a second splicing part 241. The first sidewall 224 and the second sidewall 240 cooperate to form the sidewall of the box body 2. The first splicing part 225 and the second splicing part 241 are spliced to form the partition wall. The partition wall divides the inner space of the box body 2 into the liquid cavity 220, the receiving cavity 222 and the wire cavity 223. Further, a joint of the first sidewall 224 and the first splicing part 225 defines a depression, and a joint of the second sidewall 240 and the second splicing part 241 is provided with a lug. The lug is bonded to the depression to achieve the tight and fixed connection of the top cover 24 and the bottom case 22.

In this embodiment, the driving mechanism 4 includes a motor 42 and a transmission box 44. The motor 42 is connected to the transmission box 44. The drive shaft 40 is positioned on the transmission box 44. The motor 42 inputs the torque into the transmission box 44, and the drive shaft 40 of the transmission box 44 outputs the torque. The motor 42 is at least partially positioned in the receiving cavity 222, and the transmission box 44 is positioned in the groove 20. Because the lead end of the motor 42 is located in the receiving cavity 222, the lead wire of the motor 42 can be directly laid from the receiving cavity 222 to the wire cavity 223. In addition, the transmission box 44 includes a annual projection, and the annual projection is positioned on the surface of the transmission box 44 facing the bottom cover 200 and surrounds the drive shaft 40, and the annular projection defines an annular sealing groove. The second seal ring is positioned in the annular sealing groove, and the second seal ring seals the joint of the opening of the bottom cover 200 and the transmission box 44.

In this embodiment, the top cover 24 of the box body 2 defines a liquid filling port 246 communicating with the liquid cavity 220. The liquid filling port 246 is lower than the external surface of the top of the box body 2, and the liquid inlet of the liquid releasing column 226 is higher than the liquid filling port 246, such that the liquid inlet is higher than the maximum liquid level of the liquid cavity 220.

In this embodiment, the box body 2 further includes a liquid level detector for detecting the liquid level in the liquid cavity 220. The liquid level detector includes a first electrode slice 70 and a second electrode slice 72. The first electrode slice 70 is positioned on the top cover 24, and the second electrode slice 72 is positioned on the bottom case 22. The first electrode slice 70 includes a first terminal and a first detection end. The first terminal is positioned in the receiving cavity 222 and is connected to a wire. The first detection end is positioned adjacent to the bottom of the liquid cavity 220. The second electrode slice 72 includes a second terminal and a second detection end. The second terminal is positioned in the receiving cavity 222 and is connected to the wire, and the second detection end is positioned adjacent to the bottom of the liquid cavity 220. The first detection end and the second detection end are spaced apart from each other. The connection and disconnection between the first detection end and the second detection end imply whether there is liquid or not therebetween, and then the liquid level is determined. In other embodiments, the liquid level detector can be an infrared detection device, a capacitive liquid level sensor, a Hall sensor detection device or other detection devices. The infrared detection device includes an infrared transmitter and an infrared receiver. The Hall sensor detection device includes a magnetic floater and a Hall sensor, and the magnetic floater moves along with the change of the liquid level.

In this embodiment, the lead wires of the driving mechanism 4, the lead wires of the air pump mechanism 5 and the lead wires of the liquid level detector are guided to the wire cavity 223 through the receiving cavity 222, and are electrically connected to the first connector 6 positioned on the sidewall of the box body 2. The body of the cleaning robot is equipped with the second connector. When the box body 2 is installed on the body of the cleaning robot, the first connector 6 is electrically connected to the second connector, thus supplying power for the electronic devices in the box body 2.

In this embodiment, the first connector 6 is positioned on one sidewall of the box body 2, and includes a plurality of electrode slices. The second connector includes a plurality of elastic slices. The electrode slices of the first connector 6 butts with the elastic slices of the second connector. The first connector 6 includes a first part and a second part. The first part is inserted into a first socket of the sidewall of the bottom case 22. The second part is spliced with the first part and inserted into a second socket of the top cover 24. The bottom case 22 and the top cover 24 are bonded and tightly connected to each other, and the first connector 6 is fixed on the sidewall of the box body 2. It should be noted that, in other embodiments, the first connector 6 and the second connector can be plug connectors, that is, the first connector 6 can be a male connector, the second connector can be a female connector, or the first connector 6 can be a female connector, and the second connector can be a male connector.

In this embodiment, the box body 2 includes a magnetic component 7, and the magnetic component 7 is configured to cooperate with a Hall sensor on the body of the cleaning robot, so as to detect whether the box body 2 is in place.

In this embodiment, the cleaning module 1 further includes a dust collector 8, and the dust collector 8 is detachably positioned on the sidewall of the box body 2. The dust collector 8 and the box body 2 cooperatively define a dust chamber for collecting dust, debris and other garbage. The dust collector 8 defines a garbage inlet 80 for allowing the entering of garbage. One side of the dust collector 8 is provided with a pivot, the other side of the dust collector 8 is provided with a buckle. The sidewall of the box body 2 is provided with a pivot receiver and a buckle receiver. The pivot is positioned in the pivot receiver, and the buckle is positioned in the buckle receiver.

In this embodiment, the cleaning module 1 further includes an auxiliary wheel structure 82 positioned on the bottom surface of the box body 2, for supporting the cleaning module 1 and preventing the robot body of a cleaning robot from an unbalance caused by the change of the weight of liquid in the liquid cavity 220. And referring to FIGS. 4, 6 and 8, the auxiliary wheel structure 82 includes a rotating wheel which rotates around an axis substantially vertical to the forward direction of the cleaning robot.

Figure 10:
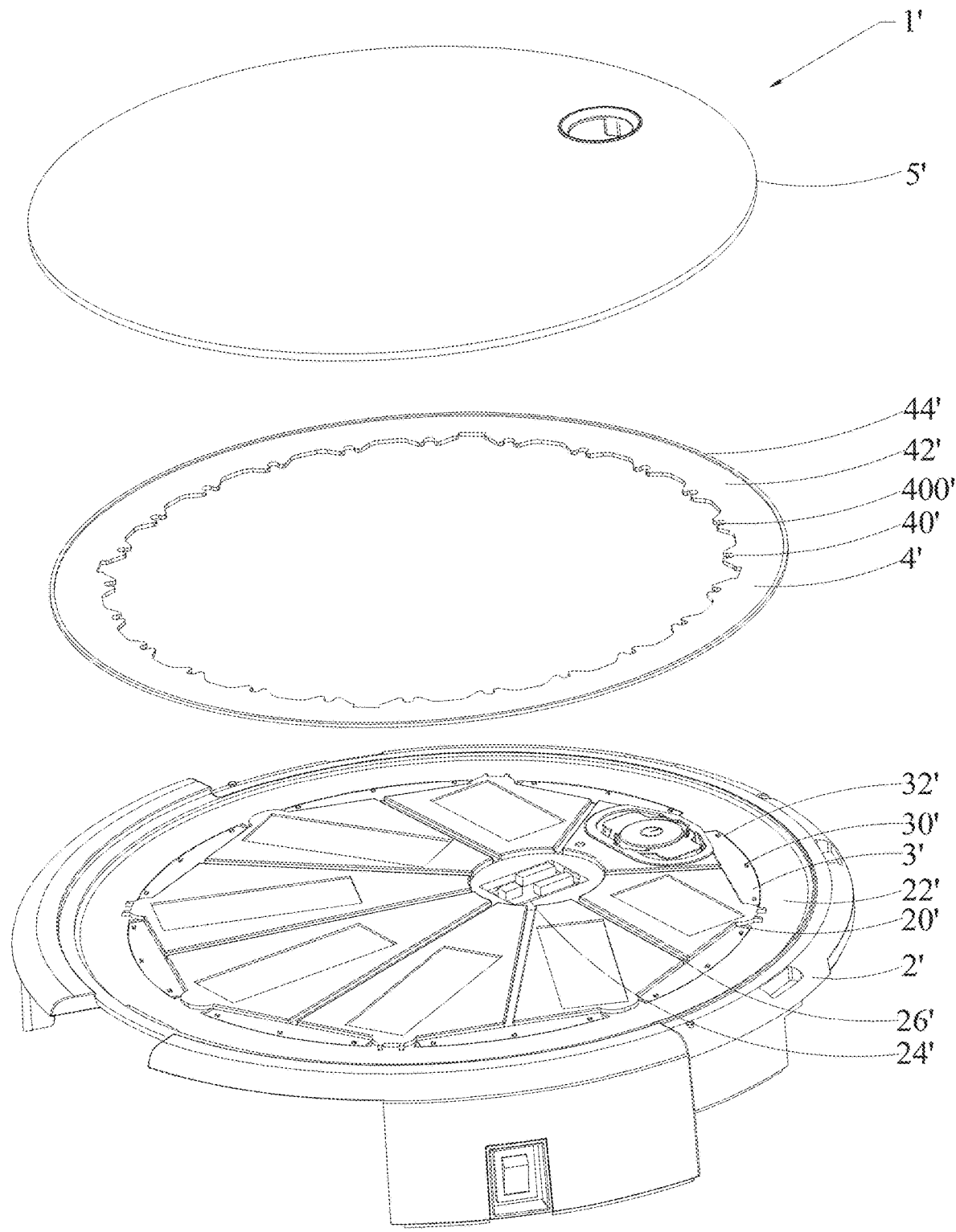
FIG. 10 is a schematic view of a cover assembly of the cleaning robot of FIG. 1.
Figure 11:
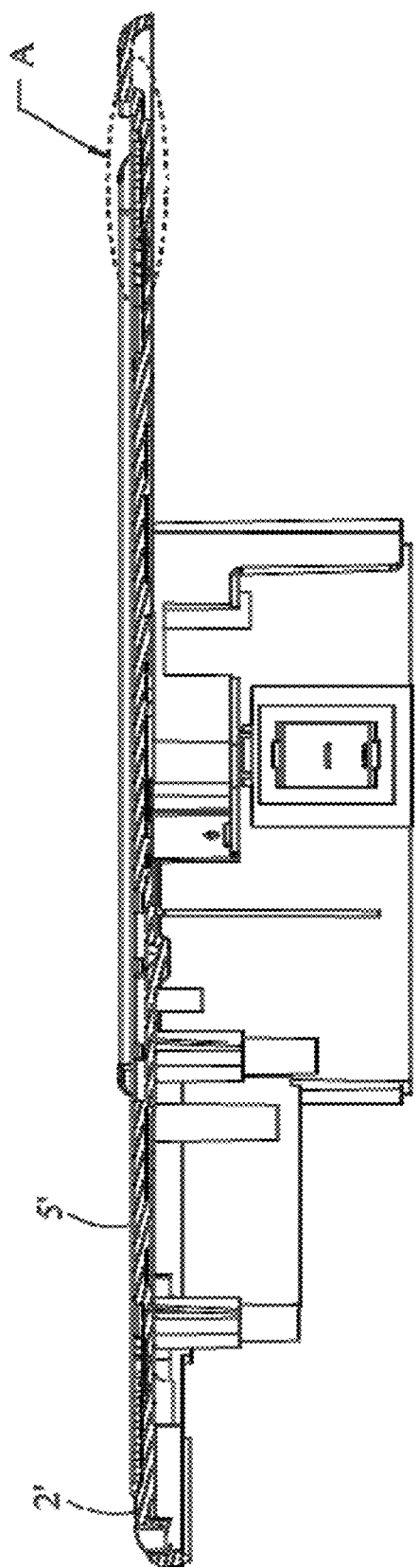
FIG. 11 is a cross-sectional view of the cover assembly of FIG. 10.
Figure 12:
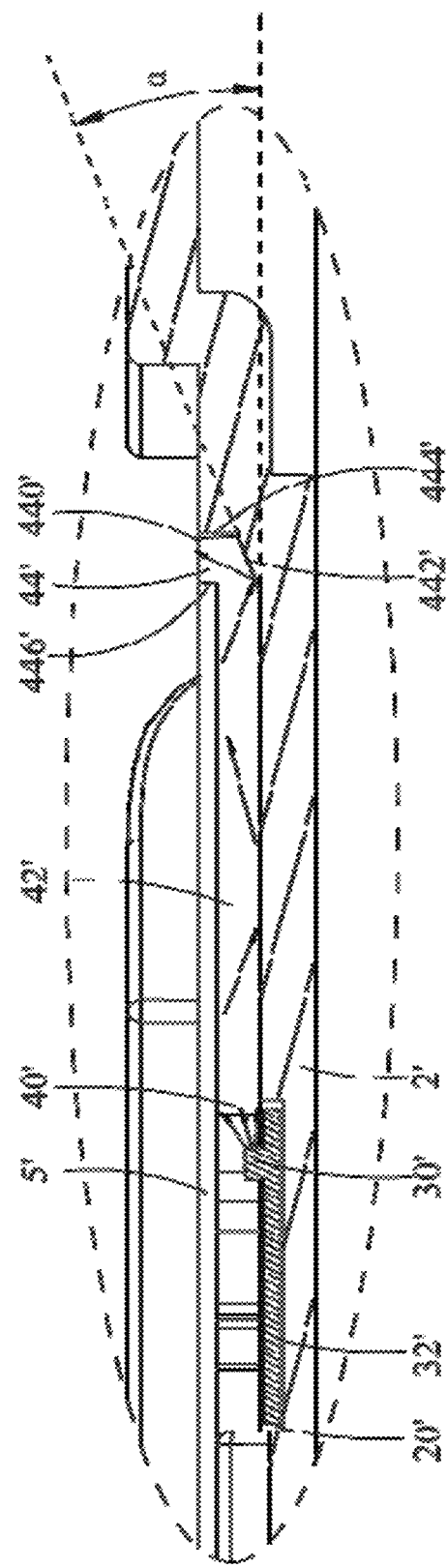
FIG. 12 is an enlarged view of part A in FIG. 11.

Referring to FIGS. 10-12, in the embodiment, the main body 9 includes a chassis and a cover assembly 1' mounted on the chassis. The cover assembly 1' includes a substrate 2', a light source 3', and a light guide plate 4'. The light source 3' is mounted on the substrate 2' and is configured to emit a light. The light guide plate 4' is mounted on the substrate 2', and the light guide plate 4' includes a light incidence part 40', a conduction part 42', and a light emergent part 44'. The conduction part 42' is connected to the light incidence part 40' and the light emergent part 44'. The light incidence part 40' is positioned correspondingly to the light source 3' for receiving the light. The conduction part 42' is configured to transmit the light to the light emergent part 44'. The light emergent part 44' includes a top surface 440' and a side surface connected to the top surface 440', and the side surface includes a light reflection slope 442' configured to reflect the light toward the top surface 440'.

In this embodiment, the light reflection slope 442' is positioned on the side surface of the light emergent part 44' of the light guide plate 4'. The light is reflected toward the top surface 440' of the light emergent part 44' and emerges out from the top surface 440', it is unnecessary to apply a groove structure in the related art. In this way, the single light guide plate 4' can realize the effect of light transmission and light direction change, thus simplifying the structure and reducing the cost.

In this embodiment, the light emergent part 44' is in a convex shape, the top surface 440' is formed on the top of the light emergent part 44', the side surface includes an outer side surface 444' and an inner side surface 446', and the light reflection slope 442' is formed on the outer side surface 444'.

In this embodiment, the outer side surface 444' and the inner side surface 446' are opaque, thus preventing the light from emerging from the outer side surface 444' and the inner side surface 446', and enhancing the light indication effect of the top surface 440'. Further, the outer side surface 444' and the inner side surface 446' each include a reflective surface, and the light is reflective repeatedly on the outer side surface 444' and the inner side surface 446', thus increasing the brightness of the top surface 440'.

In this embodiment, the light reflection slope 442' has an inclination angle α with respect to a first direction, and the first direction is a direction where the light incidence part 40' faces the light emergent part 44'.

Within the range of the inclination angle α, most of the light is reflected by the light reflection slope 442' and then emitted toward the top surface 440'. In some embodiments, the light reflection slope 442' has the inclination angle α of 22° with respect to the first direction. As needed, the inclination angle α can be set at 15°, 20°, 30°, 40°, or 45° by the person skilled in the art.

In this embodiment, the light source 3' includes a plurality of light-emitting components 30' arranged in a closed shape. The light guide plate 4' is positioned around the plurality of light-emitting components 30'. Part or all of the closed shape is lightened to form a lighting pattern to indicate the working state of the cleaning robot. The closed shape can be circular, elliptical, runway-shaped, or square-shaped, which is not limited in the present disclosure.

In this embodiment, each light-emitting component 30' is a lateral light-emitting component and includes a light-emitting side surface. The light incidence part 40' includes a light incidence side surface, and the light incidence side surface is positioned correspondingly to the light-emitting side surface. It should be understood that the plurality of light-emitting components 30' includes a plurality of light-emitting side surfaces. The light incidence side surface can be a continuous side surface and positioned correspondingly to the light-emitting side surfaces of all the light-emitting components 30'. The light incidence side surface can also include a plurality of side surfaces spaced apart from each other, and each of the spaced side surfaces is positioned correspondingly to the light-emitting side surface of each light-emitting component 30'.

In this embodiment, the light source 3' further includes a plurality of circuit boards 32' arranged in a circle, and each circuit board 32' includes an arc-shaped edge. The plurality of lateral light-emitting components are positioned apart on the circuit boards 32', respectively, and close to the arc-shaped edge. The light guide plate 4' is annular in shape. The light incidence part 40' is positioned on an inner ring of the light guide plate 4'. The light incidence part 40' includes a plurality of notches 400' spaced from each other, the light incidence side surface is formed on the notch 400', and each lateral light-emitting component is received in a corresponding one notch 400'.

In this embodiment, the substrate 2' defines a plurality of accommodation cavities 20' and a first ladder groove 22'. The plurality of accommodation cavities 20' are arranged in a circle, and the first ladder groove 22' surrounds the plurality of accommodation cavities 20'. Each circuit board 32' is received in a corresponding one accommodation cavity 20'. The light guide plate 4' is received in the first ladder groove 22'. The light incidence part 40' is at least partially positioned on the circuit board 32'. Because each circuit board 32' is received in a corresponding one accommodation cavity 20' and the light guide plate 4' is received in the first ladder groove 22', the lateral light-emitting component is exactly facing the light incidence side surface of the light incidence part 40'.

In this embodiment, the substrate 2' is, but not limited to, a top cover, which can be other structures with supporting and mounting functions, such as a flat plate.

In this embodiment, further, the light source 3' includes eight circuit boards 32'. The arc-shaped edges of the eight circuit boards 32' are located in a same circle and are arranged in circular shape. Each circuit board 32' includes three lateral light-emitting components, and all the lateral light-emitting devices are evenly arranged in a circumferential direction. The lateral light-emitting devices may be lateral light-emitting diodes. The substrate 2' further defines a second ladder groove 24' and eight wiring grooves 26'. The second ladder groove 24' is surrounded by the accommodation cavities 20' and communicates with the accommodation cavities 20' via the eight wiring grooves 26'. The light source 3' further includes a connection plate received in the second ladder groove 24'. The connection plate is connected to each circuit board 32' through a wire, and each wire is connected to the circuit board 32' and the connection plate through the wiring grooves 26'.

In this embodiment, the cover assembly 1' further includes a panel 5'. The panel 5' is received in an accommodation space defined by the light emergent part 44' of the light guide plate 4'. In some embodiments, the panel 5' is a glass panel.

In other embodiments, to prevent the light from emitting from the outer side surface 444' and/or the inner side surface 446' of the light emergent part 44' of the light guide plate 4', the side surface of the first ladder grooves 22' and/or the side surface of the panel 5' are opaque.

The working principle of the cover assembly 1' of the embodiment is as follows:

The connection plate of the light source 3' receives a control signal of a controller of the cleaning robot and controls at least part of the eight circuit boards 32' to operate. The lateral light-emitting components of part of the eight circuit boards 32' emits light. The light is received by the light incidence side surface of the light incidence part 40' of the light guide plate 4', and is transmitted from the conduction part 42' to the light emergent part 44'. The light reflection slope 442' of the light emergent part 44' reflects the light toward the top surface 440'. Because the outer side surface 444' and the inner side surface 446' each include a reflective surface, such that the light is repeatedly reflected by the side surface, and part of the light is emergent from the top surface 440'. Thus, at least part of the circular top surface 440' gives light out to form a lighting pattern. Lightening all or part of the light-emitting components can indicate different working states thereof, for example, the amount of charge can be indicated by the area of the lightened circular top surface.

The above is only an exemplary embodiment of the present disclosure and does not constitute a limitation on the protection scope of the present disclosure. Any modification, equivalent replacement and improvement made within the spirit and principle of the above exemplary embodiment shall be included in the protection scope of the present disclosure.

What is claimed is:

1. A cleaning robot, comprising a main body and a cleaning module;
    the cleaning module comprising:
        a box body, the box body comprising a first connector;
        at least one driving mechanism, the at least one driving mechanism positioned on a bottom surface of the box body, electrically connected to the first connector, and comprising at least one drive shaft; and
        at least one rotating plate assembly, each rotating plate assembly connected to a corresponding drive shaft of the at least one driving mechanism and comprising a cleaning surface, and the cleaning surface configured to rotate under the drive of the corresponding drive shaft to clean a to-be cleaned surface;
    the main body comprising:
        a second connector; the box body detachably positioned on the main body, such that the first connector is connected to or disconnected to the second connector;
        wherein the main body further comprises a chassis and a cover assembly positioned on the chassis; and the cover assembly comprises:
        a substrate;
        a light source positioned on the substrate and configured to emit light; and
        a light guide plate positioned on the substrate, the light guide plate comprising a light incidence part, a conduction part, and a light emergent part, and the conduction part being connected to the light incidence part and the light emergent part;
    the light incidence part being positioned correspondingly to the light source and configured to receive the light;
    the conduction part being configured to transmit the light to the light emergent part;
    the light emergent part comprising a top surface and a side surface connected to the top surface, and the side surface comprising a light reflection slope configured to reflect the light toward the top surface.

2. The cleaning robot of claim 1, wherein the bottom surface of the box body defines at least one groove configured to receive the at least one driving mechanism.

3. The cleaning robot of claim 1, wherein the box body defines a liquid cavity for storing a cleaning liquid, and the bottom surface of the box body defines at least one liquid outlet, and each liquid outlet communicates with the liquid cavity and is configured to output the cleaning liquid;
    each rotating plate assembly comprises:
        a rotary plate connected to the corresponding drive shaft, the rotary plate comprising a first surface facing the at least one driving mechanism and a second surface opposite to the first surface, the first surface defining an annular recess corresponding to a respective one liquid outlet in position, the annular recess comprising a bottom defining a plurality of through holes; and
        a cleaning component positioned on the second surface of the rotary plate, and the cleaning surface formed on a surface of the cleaning component facing away from the rotary plate.

4. The cleaning robot of claim 1, wherein the at least one rotating plate assembly comprises two rotating plate assemblies, and the two rotating plate assemblies are positioned side by side; and
    the at least one driving mechanism comprises two driving mechanisms, each driving mechanism is corresponding to a respective one of the two rotating plate assemblies, and each driving mechanism comprises one drive shaft.

5. The cleaning robot of claim 4, wherein the bottom surface of the box body defines two grooves spaced apart from each other, and each groove receives a respective one of the two driving mechanisms.

6. The cleaning robot of claim 5, wherein the box body further defines:
    a liquid cavity for storing cleaning liquid; and a receiving cavity separated from the liquid cavity and communicating with the two grooves, parts of the two driving mechanisms are received in the receiving cavity.

7. The cleaning robot of claim 6, wherein the bottom surface of the box body defines two liquid outlets, and each liquid outlet communicates with the liquid cavity and is configured to output the cleaning liquid; and each rotating plate assembly comprises:
a rotary plate connected to the corresponding drive shaft, the rotary plate comprising a first surface facing the two driving mechanisms and a second surface opposite to the first surface, the first surface defining an annular recess corresponding to a respective one of the two liquid outlets in position, and the annular recess comprising a bottom defining a plurality of through holes; and
a cleaning component positioned on the second surface of the rotary plate, and the cleaning surface formed on a surface of the cleaning component facing away from the rotary plate.

8. The cleaning robot of claim 7, further comprising:
an air pump mechanism, at least a part of the air pump mechanism positioned in the receiving cavity, and the air pump mechanism comprising:
an air pump received in the receiving cavity and electrically connected to the first connector; and
an air channel communicating with the air pump, the air channel running through a partition wall between the liquid cavity and the receiving cavity, and communicating with the liquid cavity.

9. The cleaning robot of claim 8, wherein the box body further comprises a wire cavity, and the wire cavity is separated from the liquid cavity and communicates with the receiving cavity;
wirings of the two driving mechanisms and wirings of the air pump mechanism run through the wire cavity and are led out of the wire cavity.

10. The cleaning robot of claim 8, wherein the box body further comprises:
two liquid releasing columns, the two liquid releasing columns being positioned in a bottom of the liquid cavity side by side, an end of each liquid releasing column defining a liquid inlet, the other end of each liquid releasing column defining a respective one of the two liquid outlets, and the liquid inlet being higher than a maximum liquid level of the liquid cavity; and
a connection assembly positioned in the liquid cavity and communicated with the liquid inlet of each liquid releasing column, the connection assembly comprising an input end, the input end being lower than the maximum liquid level of the liquid cavity and being configured to receive the cleaning liquid and delivering the cleaning liquid to each liquid inlet.

11. The cleaning robot of claim 4, wherein each of the two rotating plate assemblies comprises:

a rotary plate connected to the corresponding drive shaft, the rotary plate comprising a first surface facing the two driving mechanisms and a second surface opposite to the first surface; and
a cleaning component positioned on the second surface of the rotary plate, and an edge of the cleaning component extending out of an edge of rotary plate;
two cleaning components of the two rotating plate assemblies being positioned side by side and in contact.

12. The cleaning robot of claim 1, wherein the cleaning module further comprises a dust collector positioned on the sidewall of the box body and cooperating with the box body to define a dust chamber, and the dust collector defines an inlet.

13. The cleaning robot of claim 1, wherein the light emergent part is in a convex shape, the top surface is formed on a top of the light emergent part, the side surface comprises an outer side surface and an inner side surface, and the light reflection slope is formed on the outer side surface.

14. The cleaning robot of claim 1, wherein the light reflection slope is in an inclination angle of 15°-45° with respect to a first direction, and the first direction is a direction where the light incidence part faces the light emergent part.

15. The cleaning robot of claim 13, wherein the light source comprises a plurality of lateral light-emitting components arranged in a closed shape, and each lateral light-emitting component comprises a light-emitting side surface; and
the light guide plate is positioned around the plurality of lateral light-emitting components, the light incidence part comprises a light incidence side surface, and the light incidence side surface is positioned correspondingly to the light-emitting side surface.

16. The cleaning robot of claim 15, wherein the light source further comprises a plurality of circuit boards arranged in a circle, each circuit board comprises an arc-shaped edge, and the plurality of lateral light-emitting components are positioned apart on the plurality of circuit boards and are close to the arc-shaped edge; and
the light guide plate is annular in shape, the light incidence part is positioned on an inner ring of the light guide plate, the light incidence part defines a plurality of notches spaced from each other, each light incidence side surface is formed on a corresponding notch, and each lateral light-emitting component is received in the corresponding notch.

17. The cleaning robot of claim 16, wherein the substrate defines a plurality of accommodation cavities and a ladder groove, the plurality of accommodation cavities are arranged in a circle, and the ladder groove surrounds the plurality of accommodation cavities; and
each circuit board is received in a corresponding accommodation cavity, the light guide plate is received in the ladder groove, and the light incidence part is at least partially positioned on the circuit board.

* * * * *